US012798620B2

(12) United States Patent
Schlacter et al.

(10) Patent No.: US 12,798,620 B2
(45) Date of Patent: Nov. 17, 2026

(54) LAZY ACTOR AVOIDANCE

(71) Applicant: TORC Robotics, Inc., Blacksburg, VA (US)

(72) Inventors: Scott Schlacter, Blacksburg, VA (US); Manas Gupta, Blacksburg, VA (US); Pradeep Suresh, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 132 days.

(21) Appl. No.: 18/224,530

(22) Filed: Jul. 20, 2023

(65) Prior Publication Data

US 2025/0026376 A1 Jan. 23, 2025

(51) Int. Cl.

| | |
|---|---|
| ***B60W 60/00*** | (2020.01) |
| ***G06T 7/20*** | (2017.01) |
| ***G06T 7/215*** | (2017.01) |
| ***G06T 7/50*** | (2017.01) |
| ***G06V 20/58*** | (2022.01) |

(52) U.S. Cl.

CPC .......... *B60W 60/0017* (2020.02); *G06T 7/20* (2013.01); *G06T 7/215* (2017.01); *G06T 7/50* (2017.01); *G06V 20/58* (2022.01); *B60W 2420/403* (2013.01); *B60W 2554/4042* (2020.02); *B60W 2554/4044* (2020.02); *B60W 2554/802* (2020.02); *B60W 2556/10* (2020.02); *B60W 2720/10* (2013.01); *G06T 2207/30236* (2013.01); *G06T 2207/30241* (2013.01); *G06T 2207/30252* (2013.01); *G06V 2201/08* (2022.01)

(58) Field of Classification Search

CPC . B60W 60/0017; B60W 30/0956; G06T 7/20; G06T 7/215; G06V 20/58

See application file for complete search history.

(56) References Cited

U.S. PATENT DOCUMENTS

| | | | | |
|---|---|---|---|---|
| 11,433,922 | B1 | 9/2022 | Van Heukelom et al. | |
| 11,537,139 | B2 | 12/2022 | Rankawat | |
| 11,544,936 | B2 | 1/2023 | Chen et al. | |
| 11,755,018 | B2 | 9/2023 | Zeng et al. | |
| 11,851,081 | B2 | 12/2023 | Refaat et al. | |
| 12,240,497 | B1 * | 3/2025 | Lin | G06V 40/10 |
| 2019/0103026 | A1 * | 4/2019 | Liu | G06V 10/25 |
| 2020/0216075 | A1 * | 7/2020 | Park | G06V 10/764 |

(Continued)

*Primary Examiner* — Toya Pettiegrew

(74) *Attorney, Agent, or Firm* — Armstrong Teasdale LLP

(57) ABSTRACT

Embodiments herein include an autonomy system of an automated vehicle performing operations for detecting and avoiding lazy or unpredictable vehicles on a roadway. The autonomy system generates bounding boxes for tracking traffic vehicles recognized in sensor data. For close vehicles, the autonomy system generates expanded bounding boxes. The autonomy system determines the close vehicle is an encroaching vehicle by detecting that the expanded bounding box of the close vehicle overlapped the middle lane line or enters into the automated vehicle's current lane of travel. The autonomy system may simulate the behavior of the close vehicle by forward-propagating predicted positions of the close vehicle and expanded bounding box over some future time. In response to detecting the encroaching vehicle, the autonomy system may determine whether to perform an avoidance action or select a particular avoidance action, such as biasing away from the encroaching vehicle.

20 Claims, 7 Drawing Sheets

(56) References Cited

U.S. PATENT DOCUMENTS

| | | | | |
|---|---|---|---|---|
| 2023/0098779 | A1 | 3/2023 | Mankowski et al. | |
| 2023/0127465 | A1 * | 4/2023 | Rajendra | G06T 7/246<br>348/148 |
| 2024/0416949 | A1 * | 12/2024 | Barrera | B60W 30/16 |

* cited by examiner

LAZY ACTOR AVOIDANCE

TECHNICAL FIELD

This application generally relates to managing operations of automated vehicles, including machine-learning architectures for determining driving behaviors according to computer vision and object recognition functions.

BACKGROUND

Automated vehicles with autonomous capabilities include computing components for planning causing motion of the automated vehicle (or "ego vehicle") to, for example, follow a path with respect to the contours of a roadway, obey traffic rules, and avoid traffic and other objects in an operating environment. The motion-planning components may receive and act upon inputs from various externally facing systems, such as, for example, LiDAR system components, camera system components, and global navigation satellite systems (GNSS) inputs, among others, which may each help generate required or desired behaviors. These required or desired behaviors may be used to generate possible maneuvers for the ego vehicle within the operating environment.

In some circumstances, traffic vehicles in adjacent or nearby lanes begin to drift too closely to the automated vehicle, such as instances when other drivers are lazy, inattentive, under-the-influence, drowsy, avoiding an obstacle, or are otherwise disobeying driving norms. While conventional automated vehicles may identify and react to clearly dangerous or urgent problems, such as identifying and avoiding obstacles (e.g., stopped vehicles) in the road, conventional automated vehicles, however, are unable to identify and react to problematic traffic vehicles failing to conform with driving norms, which are typically more subtle or less certain in the patterns of behavior.

What is needed is a means for identifying and predicting non-conforming traffic vehicles, which may be operated by lazy or otherwise problematic driver. What is further needed is a means for taking action to avoid the traffic vehicle or provide a safety buffer.

SUMMARY

Embodiments herein include an autonomy system of an automated vehicle performing operations for detecting and avoiding lazy or unpredictable vehicles on a roadway. The autonomy system generates bounding boxes for tracking traffic vehicles recognized in sensor data. For close vehicles, the autonomy system generates expanded bounding boxes. The autonomy system determines the close vehicle is an encroaching vehicle by detecting that the expanded bounding box of the close vehicle overlapped the middle lane line or enters into the automated vehicle's current lane of travel. The autonomy system may simulate the behavior of the close vehicle by forward-propagating predicted positions of the close vehicle and expanded bounding box over some future time. In response to detecting the encroaching vehicle, the autonomy system may determine whether to perform an avoidance action or select a particular avoidance action, such as biasing away from the encroaching vehicle.

In some embodiments, a method for navigation planning for an automated vehicle, the method comprises identifying, by a processor of an automated vehicle, one or more traffic vehicles in image data obtained from one or more sensors of the automated vehicle; for each traffic vehicle of the one or more traffic vehicles, generating, by the processor, a bounding box associated with the traffic vehicle in the image data; identifying, by the processor, a close vehicle of the one or more traffic vehicles, the close vehicle identified within a first threshold distance from the automated vehicle; generating, by the processor, an expanded bounding box associated with the close vehicle in the image data, the expanded bounding box having a comparatively larger size than the bounding box; determining, by the processor, that the expanded bounding box of the close vehicle is within a second threshold distance from the automated vehicle, thereby detecting an encroaching vehicle as the close vehicle; and generating, by the processor, an avoidance instruction for operating the automated vehicle, in response to detecting the encroaching vehicle.

In an embodiment, a system for navigation planning for an automated vehicle, the system comprises a non-transitory computer-readable memory on board an automated vehicle configured to store image data for a roadway associated with one or more traffic vehicles obtained from one or more sensors of the automated vehicle; and a processor of the automated vehicle configured to: identify the one or more traffic vehicles in the image data obtained from the one or more sensors of the automated vehicle; for each traffic vehicle of the one or more traffic vehicles, generate a bounding box associated with the traffic vehicle in the image data; identify a close vehicle of the one or more traffic vehicles, the close vehicle identified within a first threshold distance from the automated vehicle; generate an expanded bounding box associated with the close vehicle in the image data, the expanded bounding box having a comparatively larger size than the bounding box; determine that the expanded bounding box of the close vehicle is within a second threshold distance from the automated vehicle, thereby detecting an encroaching vehicle as the close vehicle; and generate an avoidance instruction for operating the automated vehicle, in response to detecting the encroaching vehicle.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

DETAILED DESCRIPTION

Figure 1:
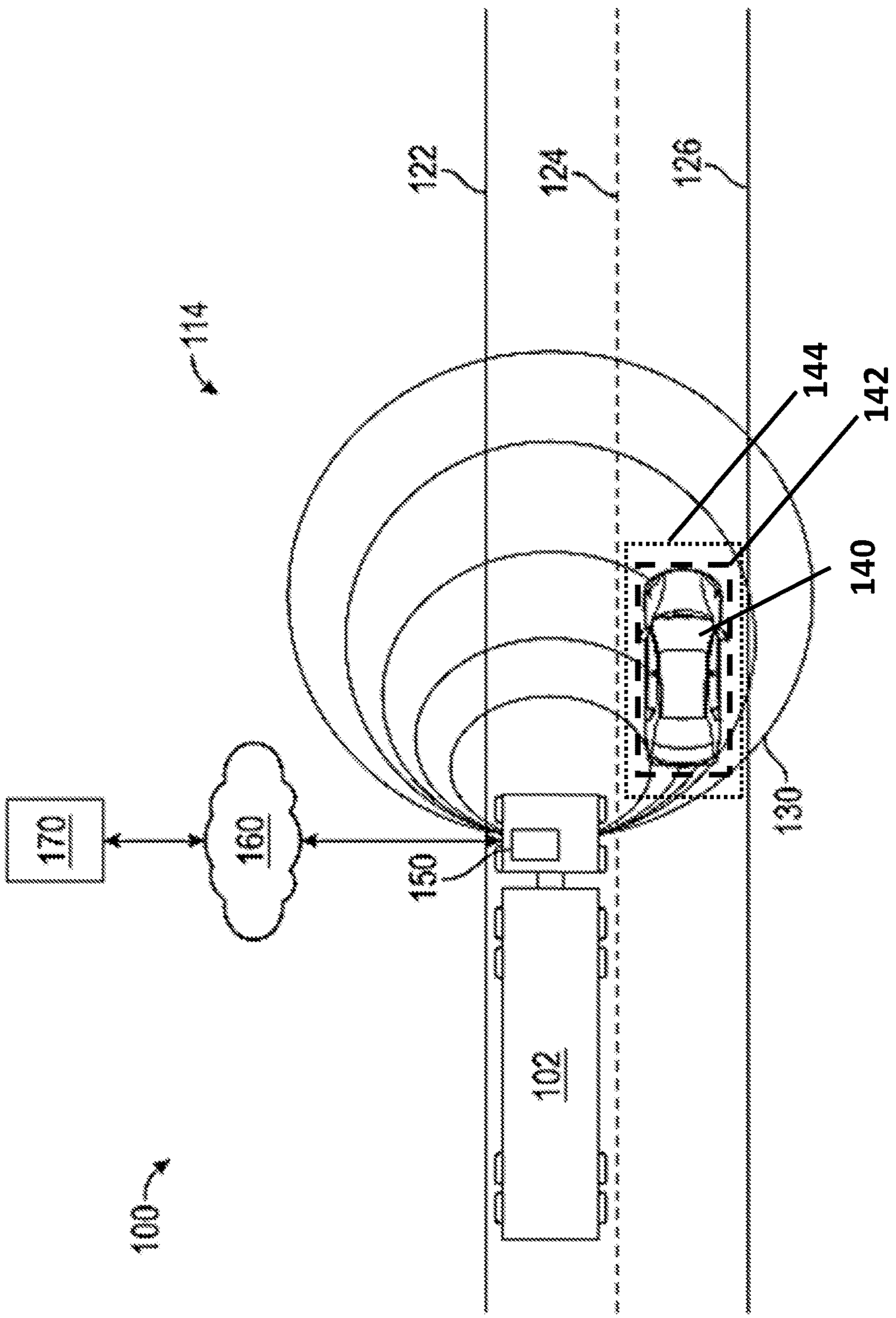
FIG. 1 shows a roadway environment, including various objects located at the roadway environment and characteristics of the roadway environment, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 shows a roadway environment 100, including various objects located at the roadway environment 100 and characteristics of the roadway environment 100, according to an embodiment. FIG. 1 further illustrates an environment 100 for modifying one or more actions of a truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete an operating mission of the truck 102, fully-autonomously or semi-autonomously.

The truck 102 includes hardware and software components of an autonomy system 150 that manages computing, processing, and navigation operations of the truck 102. The autonomy system 150 may be completely autonomous (fully-autonomous), such as self-driving, driverless, or SAE Level 4 autonomy, or semi-autonomous, such as Level 3 autonomy. As used herein, the terms “autonomous” and “automated” refer to both fully-autonomous and semi-autonomous capabilities. The present disclosure sometimes refers to “autonomous vehicles” or “automated vehicles” as “ego vehicles.” While this disclosure refers to the truck 102 (e.g., tractor-trailer) as the automated vehicle, it is understood that the automated vehicle could be any type of vehicle, including an automobile, a mobile industrial machine, or the like. While the disclosure will discuss a self-driving or driverless autonomous system 150, it is understood that the autonomous system 150 could alternatively be semi-autonomous, having varying degrees of autonomy, automated, or autonomous functionality.

The autonomy system 150 may be structured on at least three aspects of technology: (1) perception, (2) localization, and (3) planning/control. The autonomy system 150, for example, includes hardware and software components of: a perception module (sometimes referred to as a “perception engine”); a mapping-and-localization module (sometimes referred to as a “map localizer,” “localization module,” “localization engine,” or the like); and a planning-and-control module (sometimes referred to as a “planning module,” “planning engine,” “control engine,” “control engine,” or the like).

The perception engine includes hardware and software components performing functions of the perception aspect, which includes gather and interpret sensor data or other data inputs to sense the environment 100 surrounding the truck 102. To interpret the surrounding environment 100, the perception module or engine in the autonomy system 150 of the truck 102 may identify and classify objects or groups of objects in the environment 100. For example, the perception module associated with various sensors (e.g., LiDAR, camera, radar, etc.) of the autonomy system 150 may identify one or more objects (e.g., pedestrians, vehicles, debris, etc.) and features of the roadway 114 (e.g., lane lines 122, 124, 126) around the truck 102, and classify the objects in the roadway 114 (e.g., traffic vehicle 140). As show in FIG. 1, the components of perception engine aboard the automated vehicle enable the truck 102 to perceive the environment 100 within a perception radius 130. The actions of the truck 102 may depend on the extent of perception radius 130.

The perception engine (or other component of the autonomy system 150) executes software programming for a computer vision engine, which the autonomy system 150 applies to image data generated by cameras of the truck 102. The perception engine may further include an object recognition engine or software program that identifies objects, such as other traffic vehicles 140, in the image data received from the cameras or other types of sensor data. The autonomy system 150 places or overlays bounding boxes 142 around the objects detected in the image data. For instance, a bounding box 142 includes a rectangular box representation that the autonomy system 150 generates and applies (or “draws”) around an object in the image data, as identified by the computer vision engine. Each bounding box 142 represents the location and scale of potential or recognized objects within the imagery of the image data, such as traffic vehicles 140, pedestrians, bicycles, street signs, or any other relevant features in the environment 100. The autonomy system 150 may continually update the location of the bounding boxes 142 as the sensor data continues recognize and track the locations of the objects. The autonomy system 150 may determine a speed and trajectory of an object based on how the corresponding bounding box 142 changes over time.

In some embodiments, the autonomy system 150 may generate an expanded bounded box 144 around traffic vehicles 140 to represent and account for a safety buffer to maintain some distance between the truck 102 and the other traffic vehicles 140. In some implementations, the autonomy system 150 dynamically selects and applies the expanded box 144. For instance, the autonomy system 150 applies the expanded box 144 to the traffic vehicle 140 that is within a threshold range-distance in front of or behind the truck 102. Additionally or alternatively, the autonomy system 150 applies the expanded box 144 to the traffic vehicle 140 if the autonomy system 150 determines that the traffic vehicle 140 is situated horizontally (to the left or right of) the truck 102. In some cases, the autonomy system 150 applies the expanded box 140 to the traffic vehicle 140 when the autonomy system 150 determines that the traffic vehicle 140 is within a threshold horizontal distance alongside the truck 102.

The expanded bounded box 144 may be a static size or dynamically adjusted by the autonomy system 150. In some cases, the autonomy system 150 may be programmed to apply the expanded box 144 to the traffic vehicle 140 having a preconfigured, fixed size. In some cases, the autonomy system 150 is programmed to dynamically adjust the size of the expanded box 144 based upon preconfigured factors. As an example, the autonomy system 150 increases the size of the expanded box 144 as the velocity of the truck 102 or the traffic vehicle 140 slows; and the autonomy system 150 decreases the size of the expanded box 144 as the velocity of the truck 102 or the traffic vehicle 140 increases.

Using the image data, the autonomy system 150 may recognize, detect, or otherwise identify instances that the bounding box 142 or expanded box 144 of the traffic vehicle 140 overlaps, contacts, or otherwise enters a threshold safety distance from a middle lane line 124 or from the truck 102. In this way, the autonomy system may, for example, detect instances when the traffic vehicle 140 veers into (or appears to veer into) the current travel lane of the truck 102. In response to detecting that the bounding box 142 or the expanded bounding box 144 of the traffic vehicle 140 entering the threshold safety distance, the autonomy system 150 performs one or more avoidance (or safety) actions to avoid potential problems or collisions with the traffic vehicle 140. Non-limiting examples of avoidance actions include proactively veering (or "biasing") away from the traffic vehicle 140; slowing down; changing lanes into an opposite-side adjacent lane; sounding the horn of the truck 102; transmitting a message to a administrative user device or server 170 via the one or more networks 160; and generating a log entry in non-transitory machine-readable storage on board the truck 102 or at the remote server 102; among other potential actions. For instance, the autonomy system 150 may generate an operating instruction for the planning-and-control engine to execute the avoidance action by, for example, engaging the brakes or steering the truck 102.

The localization engine includes hardware and software components performing functions of the localization aspect of the autonomy system 150. The localization engine may be configured to, for example, determine where on a pre-established digital map the truck 102 is currently located. One way to do this is to sense the environment 100 surrounding the truck 102 (e.g., via the perception engine) and to correlate features of the sensed environment with details (e.g., digital representations of the features of the sensed environment) on the digital map.

The planning-and-control engine includes hardware and software components performing functions of the planning/control aspects of the autonomy system 150. After the systems on the truck 102 have determined a current location with respect to the digital map features (e.g., location on the roadway 114; upcoming intersections, road signs, etc.), the truck 102 can plan and execute maneuvers and/or routes with respect to the features of the digital map. The planning engine may be configured to, for example, make decisions about how the truck 102 should move through the environment 100, navigate the roadway 114, and arrive at a goal or destination. The autonomy system 150 may consume information from the perception and localization modules to, for example, estimate where the truck 102 is located relative to the surrounding environment 100 or broader map, and predict or track the locations and behaviors of the objects and the traffic actors (e.g., traffic vehicle 140) recognized in the environment 100.

The perception components (or perception systems) aboard the truck 102 may help the truck 102 perceive the environment 100 out to a perception radius 130. The actions of the truck 102 may depend on the extent of perception radius 130. The autonomy system 150 may include perception components or subsystems for managing operations of various perception sensors, including ingesting and processing sensor data inputs gathered and generated by the various sensors. The perception sensors and perception systems include, for example, a camera system for one or more cameras, a LiDAR system for one or more LiDAR sensors, a radar system for one or more radar sensors, a GNSS receiver and geolocation (e.g., GPS) system, and an inertial measurement unit (IMU) for inertial measurement sensors (e.g., gyroscope, accelerometer), among other types of perception sensors.

As mentioned, the perception components of the truck 102 include, for example, one or more cameras (not shown) mounted around the truck 102 and coupled to the autonomy system 150. The cameras capture imagery of the roadway environment 100 surrounding the truck 102 within the cameras' field-of-view (e.g., perception radius 130) and generate image data for the imagery. The camera sends the image data generated to the perception module of the autonomy system 150. In some embodiments, the autonomy system 150 transmits the image data generated by the cameras to the remote server 170 for additional processing.

The perception module of the autonomy system 150 may receive input sensor data from the various sensors, such as the one or more cameras, LiDARs, GNSS receiver, and/or IMU (collectively "perception data") to sense the environment 100 surrounding the truck 102 and interpret or recognize objects and roadway features in the environment 100. To interpret the surrounding environment, the perception module (or "perception engine") of the autonomy system 150 may identify and classify objects, features, characteristics of objects, or groups of objects in the environment 100. For instance, the truck 102 may use the perception module to identify one or more objects (e.g., pedestrians, vehicles, debris, etc.) or features of the roadway (e.g., intersections, road signs, traffic lights 132, lane lines 122, 124, 126) before or beside the truck 102 and classify the objects or road features in the environment 100. The perception module of the autonomy system 150 may include software components for performing an image classification function and/or a computer vision function. In some implementations, the perception module of the autonomy system 150 may include, communicate with, or otherwise execute software for performing object tracking and/or object classification functions allowing the autonomy system 150 to perform object detection and classification operations.

As an example, as the truck 102 approaches an intersection 135, the perception module of the autonomy system 150 receives image data from the cameras (or other perception sensors), capturing imagery of roadway features, such as the traffic lights 132, crosswalks, and lane lines 122, 124, 126. The autonomy system 150 executes the object recognition and classification functions to identify and classify these roadway features. When the object classification function detects a particular traffic light 132, the autonomy system 150 executes additional software components for classifying the status of the traffic light 132 (e.g., red, yellow, green). The autonomy system 150 then determines further driving operations according to the status of the traffic light (e.g., stop, slow down, continue), as well as other inputted information.

The autonomy system 150 may receive and collect perception data (or sensor input data) from the various perception sensors of the truck 102. The perception data may represent the perceived environment 100 surrounding the truck 102, for example, and may be collected using aspects of the perception system described herein. The perception data can come from, for example, one or more of the LiDAR system, the camera system, and various other externally-facing sensors and systems on board the truck 102 (e.g., the GNSS receiver). For example, where the truck 102 includes a sonar or radar system, the sonar and/or radar systems may collect those types of perception data. As the truck 102 travels along the roadway, the autonomy system 150 may continually receive perception data from the various perception systems on the truck 102. The autonomy system 150 may receive, collect, and analyze the perception data periodically and/or continuously.

In some cases, the autonomy system 150 may compare the collected perception data with stored data. The system may identify and classify various features detected in the collected perception data from the environment 100 against the features stored in a digital map. For example, the detection systems may detect the lane lines 122, 124, 126 by comparing the detected lane lines 122, 124, 126 against pre-stored information about lane lines stored in a digital map. Additionally, the detection systems could detect roadway features, such as the traffic lights 132 and crosswalks 134, by comparing such roadway features against pre-stored roadway features in the digital map. The roadway features may be stored as points (e.g., signs, small landmarks), road boundaries (e.g., lane lines 122, 124, 126, road edges), or polygons (e.g., lakes, large landmarks) and may have various properties (e.g., style, visible range, refresh rate). The roadway features may control how the autonomy system 150 interacts with the various aspects of the environment 100. In some embodiments, based on the comparison of the detected features against the known features stored in the digital map(s), the autonomy system 150 may generate a confidence level, representing a confidence of the truck 102 location with respect to the features on the digital map. The autonomy system 150 references the confidence level to confirm the actual location of the truck 102.

Figure 2:
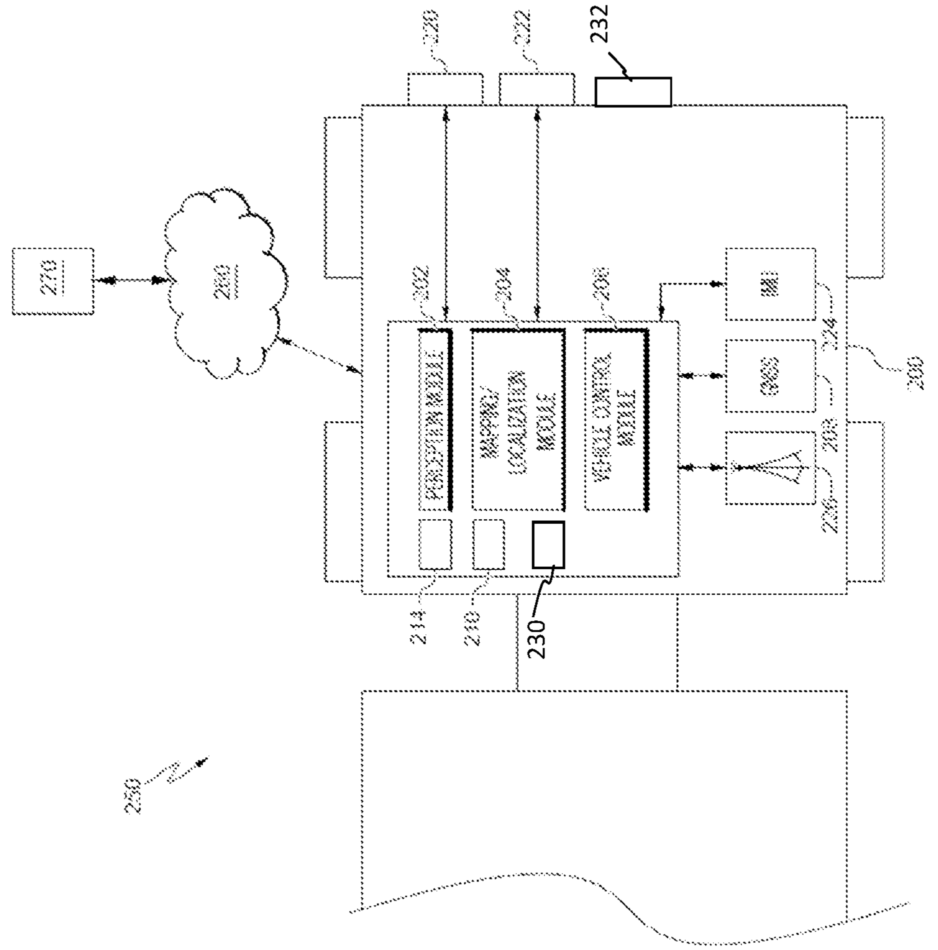
FIG. 2 shows example components of an autonomy system on board an automated vehicle, such as an automated truck (e.g., automated truck), according to an embodiment.

FIG. 2 shows example components of an autonomy system 250 on board an automated vehicle, such as an automated truck 200 (e.g., automated truck 102), according to an embodiment. The perception systems of the autonomy system 250 help the truck 200 perceive an environment (e.g., environment 100) and perform various actions. The perception system comprises hardware and software components for the vehicle system 200 that perceive the environment. The components of the perception system include, for example, a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a localization module 204, and a vehicle control module 206. The various systems may serve as inputs to and receive outputs from various other components of the autonomy system 250. Embodiments of the autonomy system 250 may include additional, fewer, or different components or systems. Similarly, each of the components or system(s) may include additional, fewer, or different components. Additionally, the systems and components shown may be combined or divided in various ways.

The camera system 220 of the perception system may include one or more cameras mounted at any location on the truck 200, which may be configured to capture images of the environment surrounding the truck 200 in any aspect or field of view (FOV) (e.g., perception field 130). The FOV can have any angle or aspect such that images of the areas ahead of, to the side, and behind the truck 200 may be captured. In some embodiments, the FOV may be limited to particular areas around the truck 200 (e.g., forward of the truck 200) or may surround 360 degrees of the truck 200. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes 140, estimated distance information, velocity information, mass information) generated by the object tracking and classification module 230 (sometimes referred to as an "object recognition engine"), can be transmitted to the remote server 270 for additional processing (e.g., correction of detected misclassifications from the image data; training of artificial intelligence models).

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and the processor of the autonomy system 250 processes the received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer, or other form of semantic digital map data). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G). In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

The memory 214 of autonomy system 250 includes any non-transitory machine-readable storage medium that stores data and/or software routines that assist the autonomy system 250 in performing various functions, such as the functions of the perception module 202, the mapping/localization module 204, the vehicle control module 206, or the object tracking and classification module 230, among other functions of the autonomy system 250. Further, the memory 214 may also store data received from various inputs associated with the autonomy system 250, such as perception data from the perception system. For example, the memory 214 may store image data generated by the camera system(s) 220, as well as types of metadata associated with the objects of the environment, such as classification data or object detection and recognition data. Non-limiting examples of the object data or metadata include: a log entry or metadata data that indicates the traffic vehicle 140, bounding boxes 140, expanded bounding boxes 144, estimated distance information (e.g., range-distance ahead or behind the truck 200; horizontal distance alongside the truck 200; safety distance from the lane line or truck 200), velocity information, and mass information, among other types of information generated by the object tracking and classification module 230.

In some embodiments, the object tracking and classification module 230 (or other component of the autonomy system 250) generates a metadata tag ("encroaching tag" or "encroachment tag") associated with a traffic vehicle in the image data and/or the non-transitory storage. The encroaching tag indicates that the autonomy system 250 should remain aware of and track. In some implementations, the autonomy system 250 generates the encroaching tag in response to detecting that the traffic vehicle, bounding box, or expanded bounding box contacts the middle lane line or enters the threshold safety distance.

In some embodiments, the object tracking and classification module 230 (or other component of the autonomy system 250) uses the encroachment tag to model or simulate the behavior of the traffic vehicle. For instance, when the autonomy system 250 determines that the expanded bounding box of the traffic vehicle overlapped the middle lane line, the autonomy system 250 updates the image data or other stored object data about the environment to include the encroachment tag associated with the traffic vehicle. The autonomy system 250 then models or simulates the behavior of the tagged traffic vehicle by forward-propagating the traffic vehicle over some future time. The autonomy system 250 may determine whether to perform an avoidance action, or select a particular avoidance action from a set of available avoidance actions, based upon the predicted behavior or predicted location of the traffic vehicle at the future time. In this way, the autonomy system 250 tags the traffic vehicle as an encroaching traffic vehicle and, based on the predicted or likely behavior or location of the encroaching vehicle at the future point in time, the autonomy system 250 determines whether to perform the avoidance action (e.g., bias away from the encroaching vehicle) or which avoidance action(s) to perform.

As noted above, perception module 202 may receive input from the various sensors, such as camera system 220, LiDAR system 222, GNSS receiver 208, and/or IMU 224 (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, etc.) or features of the roadway (e.g., intersections, road signs, lane lines) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The system 250 may collect perception data. The perception data may represent the perceived environment surrounding the truck 200, for example, and may be collected using aspects of the perception system described herein. The perception data can come from, for example, one or more of the LiDAR system 222, the camera system 220, and various other externally-facing sensors and systems on board the truck 200 (e.g., GNSS 208 receiver). For example, on vehicles having a sonar or radar system, the sonar and/or radar systems may collect perception data. As the truck 200 travels along the roadway, the system 250 may continually receive data from the various systems on the truck 200. In some embodiments, the system 250 may receive data periodically and/or continuously.

The system 250 may compare the collected perception data with stored data. For instance, the system 250 may identify and classify various features detected in the collected perception data from the environment with the features stored in a digital map. For example, the detection systems of the system 250 may detect the lane lines and may compare the detected lane lines with lane lines stored in a digital map. Additionally, the detection systems of the system 250 could detect the traffic lights by comparing such features with features in a digital map. The features may be stored as points (e.g., signs, small landmarks), lines (e.g., lane lines, road edges), or polygons (e.g., lakes, large landmarks) and may have various properties (e.g., style, visible range, refresh rate, etc.), where such properties may control how the system 250 interacts with the various features. In some embodiments, based on the comparison of the detected features against the features stored in the digital map(s), the system 250 may generate a confidence level, which may represent a confidence in the calculated location of the truck 200 with respect to the features on a digital map and hence, the actual location of the truck 200 as determined by the system 250.

The image classification function may determine the features of an image (e.g., visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of object motion and/or size). The computer vision function may be embodied by a software module (e.g., the object detection and classification module 230) that may be communicatively coupled to a repository of images or image data (e.g., visual data; point cloud data), and may additionally implement the functionality of the image classification function.

Localization module 204 receives perception data that can be compared to one or more digital maps stored in the localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, or the like. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard automated vehicle, or another vehicle, can run a route several times and collect the location of all targeted map features relative to the position of the truck 200 conducting the map generation and correlation. These repeated observations can be averaged together in a known way to produce a highly accurate, high-fidelity digital map. This generated digital map can be provided to each truck 200 (e.g., from a remote server 270 via a network 260 to the truck 200) before the truck 200 departs on a mission so the truck 200 can carry the digital onboard and use the digital map data within the mapping/localization module 204. Hence, the truck 200 and other vehicles (e.g., a fleet of trucks similar to the truck 200) can generate, maintain (e.g., update), and use a particular instance of each truck's 200 generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 (of the planning-and-control module) may control the behavior and maneuvers of the truck. For example, once the systems on the truck have determined its location with respect to map features (e.g., intersections, road signs, lane lines) the truck may use the truck 200 control module 206 and its associated systems to plan and execute maneuvers and/or routes with respect to the features of the environment. The vehicle control module 206 may make decisions about how the truck 200 will move through the environment to get to a goal or destination as the truck 200 completes the mission. The vehicle control module 206 may consume information from the perception module 202 and the maps/localization module 204 to know where the truck 200 is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle-steering system, a propulsion system, and/or a braking system. The propulsion system may be configured to provide powered motion for the truck 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system). The vehicle control module 206 may be configured to avoid obstacles in the environment surrounding the truck 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

Figure 3:
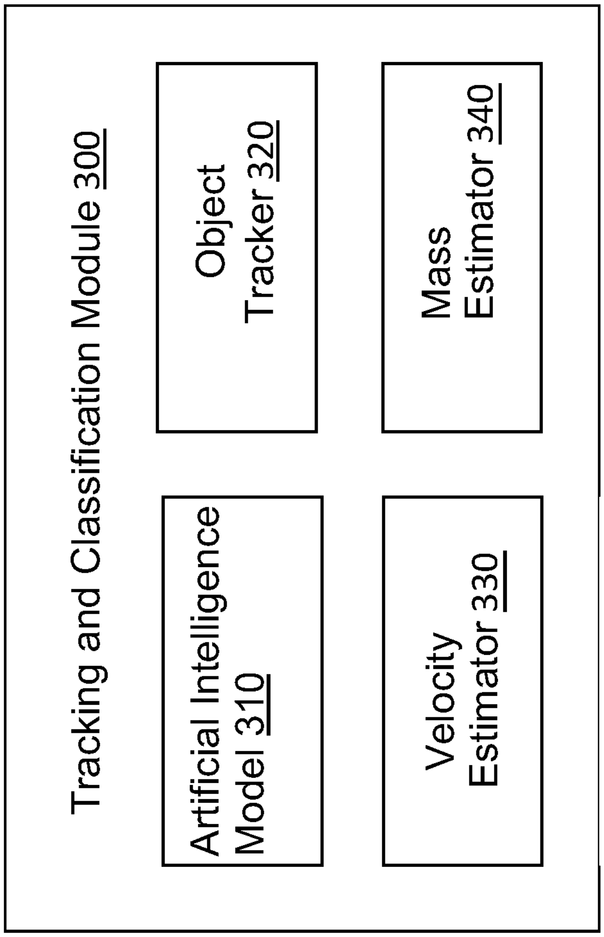
FIG. 3 shows an object tracking and classification module of an autonomy system of an automated vehicle, according to an embodiment.

FIG. 3 shows an object tracking and classification module 300 of an autonomy system (e.g., autonomy system 150, 250) of an automated vehicle (e.g., truck 102, 200), according to an embodiment. The object tracking and classification module 300 includes an artificial intelligence model 310, object tracker 320, velocity estimator 330, and effective mass estimator 340. These components of the object detecting and tracking module 300 may be either or both software-based components and hardware-based components. In some embodiments, one or more various types of data or software components of the object tracking and classification module 300 may be stored and executed by a remote server (e.g., remote server 170, 270).

In an embodiment, the object tracking and classification module 300 executes the artificial intelligence model 310 to detect and classify objects in sequences of images captured by at least one sensor (e.g., a camera; a video camera; video streaming device) of the automated vehicle. In some implementations, the artificial intelligence model 310 can be executed in response to receiving an image from at least one sensor of the automated vehicle. The artificial intelligence model 310 can be or may include one or more neural networks. The artificial intelligence model 310 can be a single shot multi-box detector, and can process an entire input image in one forward pass. Processing the entire input image in one forward pass improves processing efficiency, and enables the artificial intelligence model 310 to be utilized for real-time or near real-time autonomous driving tasks.

In some embodiments, the input to the artificial intelligence model 310 may be pre-processed, or the artificial intelligence model 310 itself may perform additional processing on the input data. For example, an input image to the artificial intelligence model 310 can be divided into a grid of cells of a configurable (e.g., based on the architecture of the artificial intelligence model 310) size. The artificial intelligence model 310 can generate a respective prediction (e.g., classification, object location, object size/bounding box) for each cell extracted from the input image. As such, each cell can correspond to a respective prediction, presence, and location of an object within its respective area of the input image. The artificial intelligence model 310 may also generate one or more respective confidence values indicating a level of confidence that the predictions are correct. If an object represented in the image spans multiple cells, the cell with the highest prediction confidence can be utilized to detect the object. The artificial intelligence model 310 can output bounding boxes, expanded bounding boxes, and class probabilities for each cell, or may output a single bounding box and class probability determined based on the bounding boxes and class probabilities for each cell. In some embodiments, the class and bounding box predictions are processed by non-maximum suppression and thresholding to produce final output predictions.

The artificial intelligence model 310 may be or may include a deep convolutional neural network (CNN) or other machine-learning techniques, which may include one or more layers of a machine-learning architecture that implements machine-learning functionality. The one or more layers can include, in a non-limiting example, convolutional layers, max-pooling layers, activation layers and fully connected layers, among others. Convolutional layers can extract features from the input image (or input cell) using convolution operations. The convolutional layers can be followed, for example, by activation functions (e.g., a rectified linear activation unit (ReLU) activation function, exponential linear unit (ELU) activation function), model. The convolutional layers can be trained to process a hierarchical representation of the input image, where lower level features are combined to form higher-level features that may be utilized by subsequent layers in the artificial intelligence model 310.

The artificial intelligence model 310 may include one or more max-pooling layers, which may down-sample the feature maps produced by the convolutional layers, for example. The max-pooling operation can replace the maximum value of a set of pixels in a feature map with a single value. Max-pooling layers can reduce the dimensionality of data represented in the artificial intelligence model 310. The artificial intelligence model 310 may include multiple sets of convolutional layers followed by a max-pooling layer, with the max-pooling layer providing its output to the next set of convolutional layers in the artificial intelligence model. The artificial intelligence model 310 can include one or more fully connected layers, which may receive the output of one or more max-pooling layers, for example, and generate predictions as described herein. A fully connected layer may include multiple neurons, which perform a dot product between the input to the layer and a set of trainable weights, followed by an activation function. Each neuron in a fully connected layer can be connected to all neurons or all input data of the previous layer. The activation function can be, for example, a sigmoid activation function that produces class probabilities for each object class for which the artificial intelligence model is trained. The fully connected layers may also predict the bounding box coordinates for each object detected in the input image.

The artificial intelligence model 310 may include or may utilize one or more anchor boxes or expanded bounding boxes to improve the accuracy of its predictions. Anchor boxes can include predetermined boxes with different aspect ratios that are used as references for final object detection predictions. The artificial intelligence model 310 can utilize anchor boxes to ensure that the bounding boxes or expanded bounding boxes that the artificial intelligence model 310 outputs have the correct aspect ratios for the objects they are detecting. The predetermined anchor boxes may be pre-defined or selected based on prior knowledge of the aspect ratios of objects that the model will encounter in the images captured by the sensors of automated vehicles. The size and aspect ratios of anchor boxes can be determined based on statistical analysis of the aspect ratios of objects in a training dataset, for example. The anchor boxes may remain fixed in size and aspect ratio during both training and inference, and may be chosen to be representative of the objects in the target dataset. The anchor boxes may be updated to reflect the expanded bounding boxes added for a particular object.

The artificial intelligence model 310 may be trained at one or more remote servers using any suitable machine-learning training technique, including supervised learning, semi-supervised learning, self-supervised learning, or unsupervised learning, among other techniques. In an example training process, the artificial intelligence model 310 can be trained using a set of training data that includes images of objects and corresponding ground truth data specifying the bounding boxes or expanded bounding boxes and classifications for those objects. The images used in the training data may be received from automated vehicles described herein, and the ground-truth values may be user-generated through observations and experience to facilitate supervised learning. In some embodiments, the training data may be pre-processed via any suitable data augmentation approach (e.g., normalization, encoding, any combination thereof) to produce a new dataset with modified properties to improve model generalization using ground truth.

The object tracker 320 may track objects detected in the sequences of images by the artificial intelligence model 310. The object tracker 320 may perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size). To do so, the object tracker 320 may execute a discriminative correlation filter tracker with channel and spatial reliability of tracker (CSRT) to predict a position and size of a bounding box in a second image given a first image (and corresponding bounding box) as input. In some embodiments, the object tracker 320 may utilize alternative tracking algorithms, including but not limiting to Boosting, Multiple Instance Learning (MIL), or Kernelized Correlation Filter (KCF), among others.

The object tracker 320 can determine that an object has been detected in a first image of a sequence of images captured by the sensors of the automated vehicle. If the object has not appeared in any previous images (e.g., a tracking process has failed to associate the object with a previously tracked object in previous images), the object tracker 320 can generate a tracking identifier for the object, and begin a new tracking process for the object in the first image and subsequent images in the sequence of images. The object tracker 320 can utilize the CSRT algorithm to learn a set of correlated filters that represent detected object and its appearance in the first image, and update these filters in each subsequent image to track the object in the subsequent images. The correlation between the filters and the image is maximized to ensure that the object is accurately located in each image, while the correlation with the background is minimized to reduce false positive detections. In each subsequent incoming image (e.g., as is it captured, or as the object tracker 320 iterates through a previously captured sequence of images, etc.), the object tracker 320 can output the predicted position and size of a bounding box for the object in the subsequent image, and compare the predicted bounding box with the actual bounding box (e.g., generated by the artificial intelligence model 310) in the subsequent image.

The object tracker 320 can associate the newly detected object with the generated tracking identifier if the Intersection Over Union (IOU) of the predicted bounding box and the actual bounding box is greater than a predetermined value. The object tracker 320 can calculate the IOU as the ratio of the area of the intersection of two bounding boxes to the area of their union. To calculate the IOU, the object tracker 320 can determine the coordinates of the top-left and bottom-right corners of the overlapping region between the two bounding boxes (e.g., by subtracting determined coordinates of each bounding box). Then, the object tracker 320 can calculate the width and height of the overlap and utilize the width and height to calculate the area of the overlap. The object tracker 320 can calculate the area of union as the sum of the areas of the two bounding boxes minus the area of their overlap, and then calculate the IOU as the ratio of the area of intersection to the area of the union.

In some implementations, the object tracker 320 can utilize the Kuhn-Munkres algorithm to perform matching of bounding boxes (or expanded bounding boxes) to existing tracking identifiers. The Kuhn-Munkres algorithm can be utilized to find the optimal assignment between the predicted bounding boxes (or expanded bounding boxes) and the detected bounding boxes (or expanded bounding boxes) that minimizes the sum of the costs (or maximizes the negation of the costs) associated with each assignment. The cost of an assignment may be for example, the IOU between the bounding boxes (or expanded bounding boxes), or in some implementations, the Euclidean distance between the centers of the bounding boxes (or expanded bounding boxes). When executing the Kuhn-Munkres algorithm, the object tracker 320 can create a cost matrix (or other similar data structure). Each element of the matrix can represent the cost of assigning a predicted bounding box to a detected bounding box. The cost matrix may represent a bipartite graph (e.g., an adjacency matrix with each edge indicated as a cost). The object tracker 320 can determine the optimal assignment (e.g., the tracking identifier to associate with the detected bounding boxes or expanded bounding boxes) by optimizing for the maximum sum of the negation of the cost matrix for the pairs of bounding boxes or expanded bounding boxes (e.g., a maximum weight matching for the weighted bipartite graph).

In some implementations, the object tracker 320 can execute the Kuhn-Munkres algorithm to determine the best matching pairs within the bipartite graph. To do so, the object tracker 320 can assign each node in the bipartite graph a value that represents the best case of matching in the bipartite graph. For any two connected nodes in the bipartite graph, that the assigned value of two nodes is larger or equal to the edge weight. In this example, each node in the bipartite graph represents a predicted bounding box (or expanded bounding box) or a detected bounding box (or expanded bounding box), and the predicting bounding boxes (or expanded bounding boxes) can only match to the detected bounding boxes (or expanded bounding boxes), or vice versa. In some implementations, the values can be assigned to each of the nodes representing predicted bounding boxes (or expanded bounding boxes), and the node value of the nodes in the bipartite graph that represent detected bounding boxes (or expanded bounding boxes) can be assigned to a node value of zero.

When executing the Kuhn-Munkres algorithm, the object tracker 320 can continuously iterate through each of the nodes in the bipartite graph determined for the cost matrix to identify an augmenting path starting from unmatched edges at the node and ending in another unmatched edge. The object tracker 320 can take the negation of the augmenting path, to identify one or more matching nodes. In some cases, when executing the Kuhn-Munkres algorithm, the object tracker 320 may be unable to resolve a perfect match through negation of the augmenting path. For the unsuccessful augmenting path, the object tracker 320 can identify all the related nodes (e.g., nodes corresponding to predicted bounding boxes or expanded boxes) and calculate a minimum amount by which to decrease their respective node value to match with their second candidate (e.g., a node representing a corresponding detected bounding box or expanded box). In order to keep the sum of linked nodes the same, the amount by which the node values are increased can be added to nodes to which said nodes are matched. In some implementations, the Kuhn-Munkres algorithm can be executed when the number of predicted bounding boxes and the number of detected bounding boxes is the same. If the number of predicted bounding boxes and the number of detected bounding boxes is different, the object tracker 320 can generate placeholder data representing fake bounding boxes to satisfy the requirements of the Kuhn-Munkres algorithm.

In some implementations, the object tracker 320 can implement an occlusion strategy, which handles cases where tracking fails for two or more consecutive images. One occlusion strategy is to delete or remove the tracking identifier when an object fails to appear (or be correctly tracked) in a subsequent image in the sequence of images. Another occlusion strategy is to only delete the tracking identifier if an object has failed to be tracked for a predetermined number of images (e.g., two consecutive images, five consecutive images, ten consecutive images). This can enable the object tracker 320 to correctly detect and track objects even in cases where the artificial intelligence model 310 fails to detect an object that is present in the sequence of images for one or more consecutive images. The object tracker 320 may also execute one or more of the operations described in connection with embodiments for determining a correction to a classification of objects detected in the sequence of images.

Velocity estimator 330 may determine the relative velocity of target objects relative to the ego vehicle. Effective mass estimator 340 may estimate effective mass of target objects, e.g., based on object visual parameters signals from an object visual parameters component and object classification signals from a target object classification component. The object visual parameters component may determine visual parameters of a target object such as size, shape, visual cues and other visual features in response to visual sensor signals, and generates an object visual parameters signal. The target object classification component may determine a classification of a target object using information contained within the object visual parameters signal, which may be correlated to various objects, and generates an object classification signal. For instance, the target object classification component can determine whether the target object is a plastic traffic cone or an animal.

In some implementations, the object tracking and classification module 300 may include a cost analysis function module. The cost analysis function module may receive inputs from other components of object tracking and classification module 300 and generates a collision-aware cost function. The autonomy system may apply this collision-aware cost function in conjunction with other functions used in path planning. In an embodiment, the cost analysis function module provides a cost map that yields a path that has appropriate margins between the automated vehicle and surrounding target objects.

Objects that may be detected and analyzed by the object tracking and classification module 300 include moving objects such as other vehicles, pedestrians, and cyclists in the proximal driving area. Target objects may include fixed objects such as obstacles; infrastructure objects such as rigid poles, guardrails, or other traffic barriers; and parked cars. Fixed objects, also herein referred to herein as static objects and non-moving objects can be infrastructure objects as well as temporarily static objects such as parked cars. Externally-facing sensors may provide the autonomy system (and the object tracking and classification module 300) with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

Figure 4A:
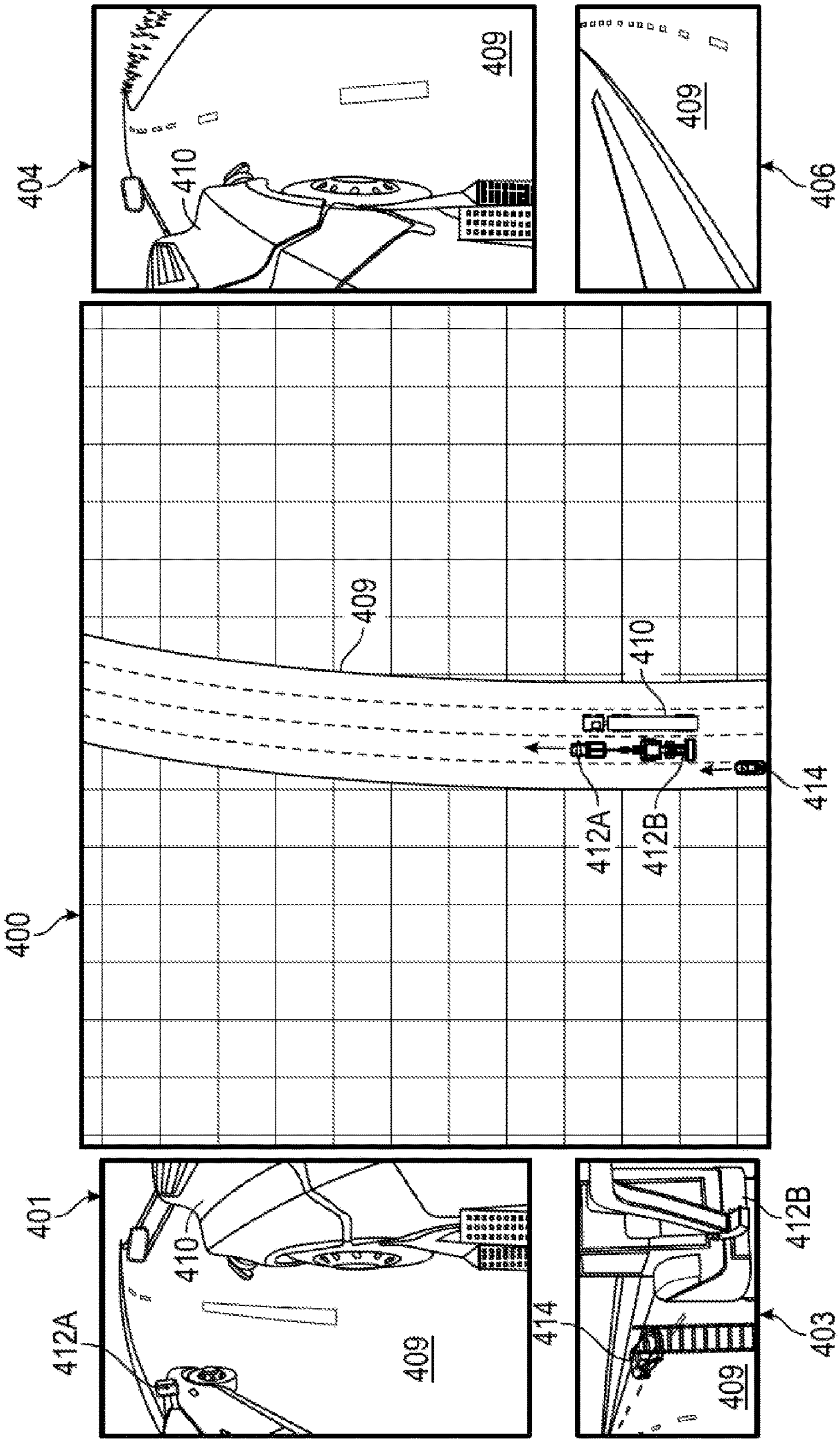
FIGS. 4A-4C show a graphical representation of an operating environment of an automated vehicle (ego vehicle) over time, according to an embodiment.
Figure 4B:
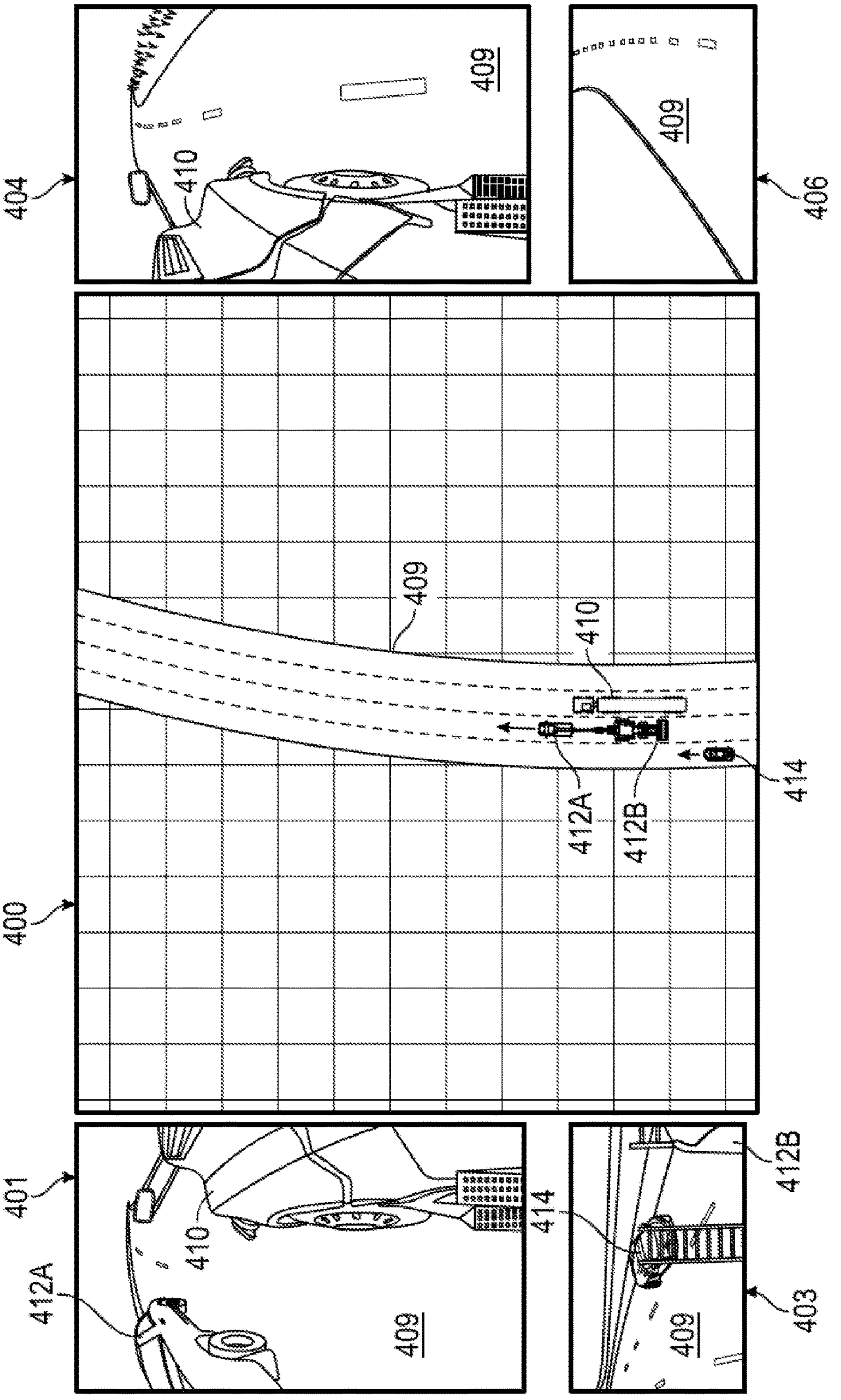
Figure 4C:
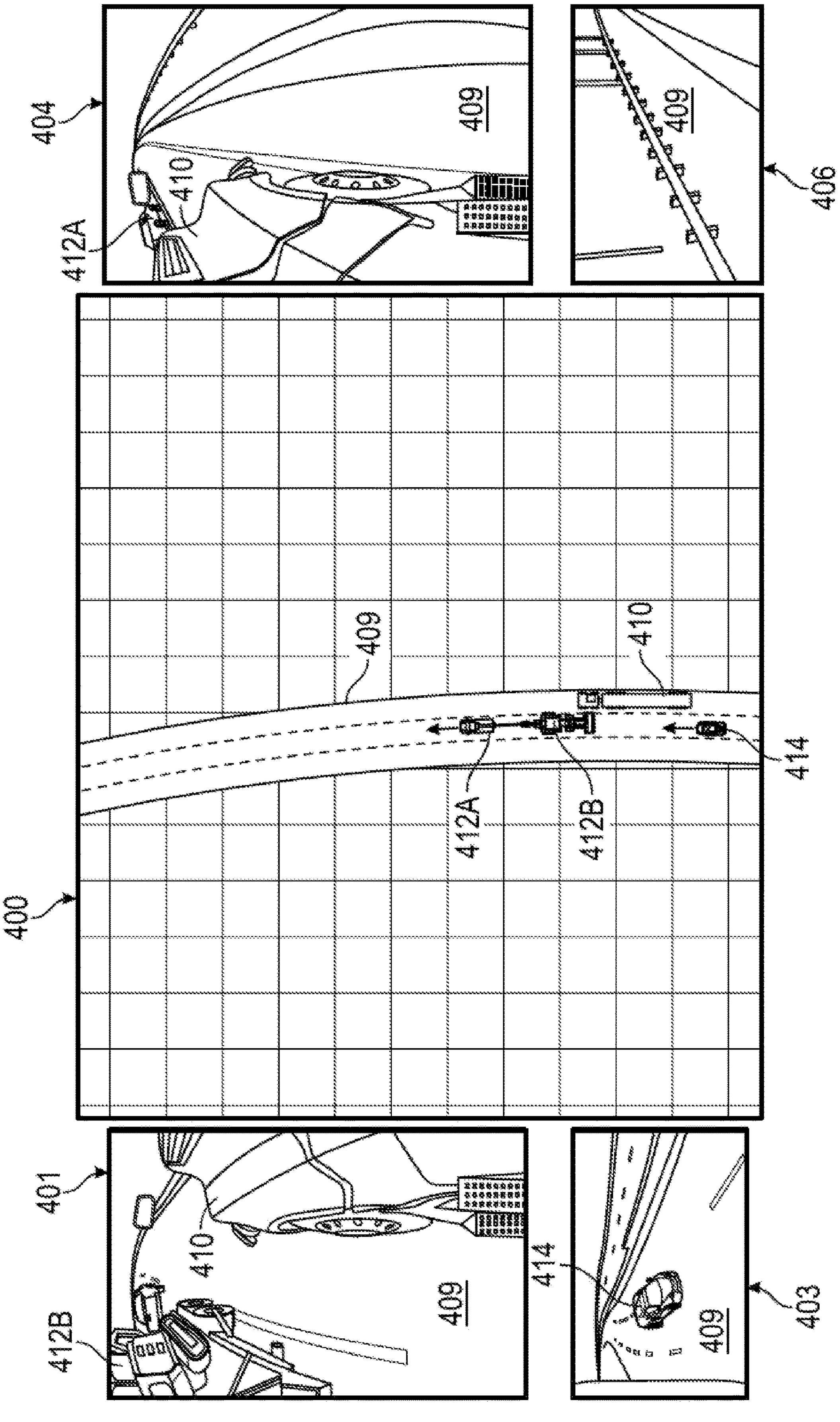

FIGS. 4A-4C show a graphical representation 400 of an operating environment of an automated vehicle (ego vehicle 410) over time, according to an embodiment. The ego vehicle 410 is shown as an automated truck (e.g., automated truck 102, 200), such as a tractor-trailer. The operating environment includes a roadway 409 with the ego vehicle 410 and traffic vehicles 412, 414, including a pickup truck **412*a* towing a trailer 412*b* (collectively, a traffic truck 412) and a traffic car 414. An autonomy system of the ego vehicle 410 receives and processes image data from cameras to classify and track objects, such the traffic vehicles 412, 414, and generate or update the graphical representation 400. For ease of understanding, the FIGS. 4A-4C include the outputted image data of the graphical representation 400, though embodiments need not generate a viewable output of the graphical representation 400. In addition, for ease of understanding, FIGS. 4A-4C depict live camera feeds corresponding to the graphical representation 400 at discrete instances over time, including a forward left-quarter camera feed 401, backward left-quarter camera feed 403, forward right-quarter camera feed 404, and backward right-quarter camera feed 406**.

In FIG. 4A, at a first moment in time, the ego vehicle 410 is driving in a middle lane of the roadway 409, the traffic truck 412 is traveling on the left of the ego vehicle 410 in an adjacent lefthand lane, and the traffic car 414 is traveling behind the traffic truck 412 in the adjacent lefthand lane. As shown in forward left-quarter camera feed 401, the pickup truck 412*a* is traveling alongside a cab (or tractor) at the frontend of the ego vehicle 410 and the towed-trailer 412*b* is traveling alongside the ego-trailer toward the back of the ego vehicle 410. The autonomy system ingests the image data from the cameras and applies the object recognition engine to identify and classify the traffic vehicles 412, 414. The autonomy system then generates the graphical representation 400 to reflect the detected traffic vehicles 412, 414, and includes bounding boxes (not shown) for the traffic vehicles 412, 414. The autonomy system may detect that traffic truck 412 is within a threshold range-distance (e.g., the traffic truck 412 is 0 meters ahead of or behind the ego vehicle 410) and within a threshold horizontal distance (e.g., the traffic truck 412 is 3 meters alongside the ego vehicle 410), and then generate an expanded bounding box (not shown) for the traffic truck 412. For the traffic car 414, the autonomy system determines that the traffic car 414 is beyond the threshold range-distance (e.g., the traffic car 414 is 10 meters behind the ego vehicle 410) and merely applies an ordinary bounding box of the traffic car 414 in the graphical representation 400.

In FIG. 4B, at a next moment in time, the ego vehicle 410 continues traveling in the middle lane of the roadway 409, the traffic truck 412 continues traveling on the left of the ego vehicle 410 in the adjacent lefthand lane, and the traffic car 414 continues traveling behind the traffic truck 412 in the adjacent lefthand lane. The pickup truck 412*a* moved further ahead of the cab of the ego vehicle 410, as shown in the forward left-quarter camera feed 401. However, the trailer 412*b* remains alongside some portion of the ego vehicle 410 (e.g., ego-cab, ego-trailer), as shown in the backward left-quarter camera feed 403. Accordingly, the autonomy system determines that the traffic truck 412 is still within the threshold range-distance from the ego vehicle 410 and maintains the expanded bounding box assigned to the traffic truck 412. For the traffic car 414, the autonomy system determines that the traffic car 414 is still beyond the threshold range-distance behind the ego vehicle 410 and maintains the ordinary bounding box assigned to the traffic car 414.

In FIG. 4C, at a later moment in time, the roadway 409 narrowed to three lanes from four lanes (as in FIGS. 4A-4B). The ego vehicle 410 changed lanes and is traveling in a righthand lane of the roadway 409. The traffic truck 412 changed lanes and is traveling in the middle lane of the roadway 409, adjacent to ego vehicle 410. The traffic car 414 continues traveling in the lefthand lane of the roadway 409. As shown in the forward left-quarter camera feed 401, the pickup truck 412*a* moved further ahead of the cab of the ego vehicle 410, but the trailer 412*b* remains alongside the ego-cab. Accordingly, the autonomy system determines that the traffic truck 412 is still within the threshold range-distance from the ego vehicle 410 and maintains the expanded bounding box assigned to the traffic truck 412. For the traffic car 414, the autonomy system determines that the traffic car 414 is still beyond the threshold range-distance behind the ego vehicle 410 and maintains the ordinary bounding box assigned to the traffic car 414.

The autonomy system determines that some portion of the traffic truck 412 contacts the lane line or moves too closely to the ego vehicle 410, as shown in the forward left-quarter camera feed 401. Using the image data of the graphical representation 400, the autonomy system may detect when the expanded bounding box of the traffic truck 412 overlaps or contacts the lane line or when the expanded bounding box moves within a threshold safety distance from a digital representation of the ego vehicle 410. In response to determining that the traffic truck 412 is veering over the lane line into the ego vehicle's 410 current lane of travel or listing too closely to the ego vehicle 410, the autonomy system generates instructions for a control module of the autonomy system to perform an avoidance action. For example, when the trailer 412*b* overlaps the lane line into the ego vehicle's 410 current lane (as shown in the forward left-quarter camera feed 401), the ego vehicle 410 biases or veers away from the trailer 412*b*, causing the ego vehicle 410 to cover a boundary lane line of the shoulder of the roadway 409 (as shown in forward right-quarter camera feed 404).

Figure 5:
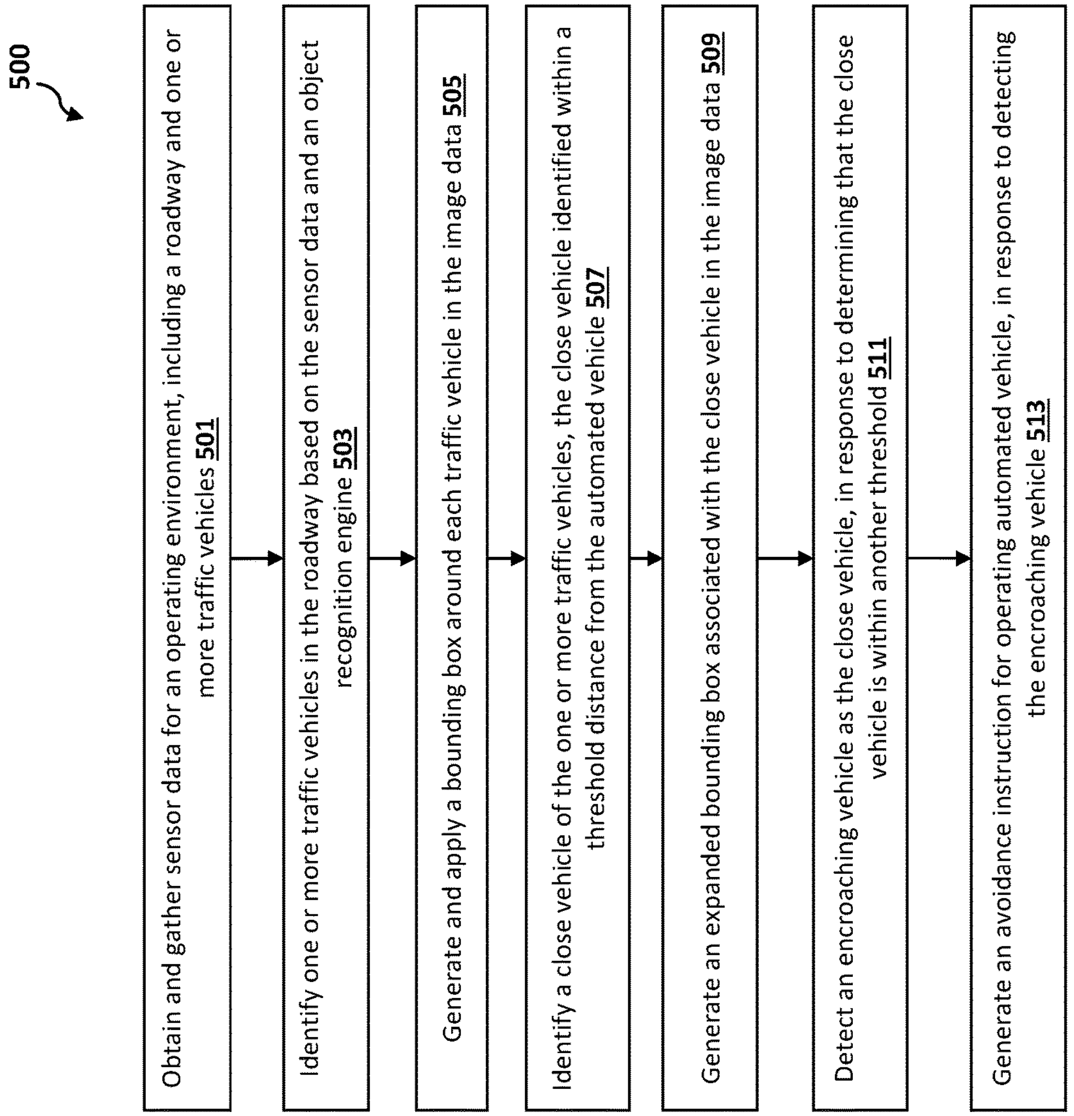
FIG. 5 is a flow diagram of an example method for identifying and avoiding other traffic vehicles by an autonomy system of an automated vehicle, according to an embodiment.

FIG. 5 is a flow diagram of an example method 500 for identifying and avoiding other traffic vehicles by an autonomy system of an automated vehicle, according to an embodiment. The operational steps of the method 500 may be executed by components of the autonomy system (e.g., analysis and control module 300). It should be appreciated that other embodiments may comprise additional or alternative execution steps, or may omit one or more steps altogether. It should also be appreciated that other embodiments may perform certain execution steps in a different order. The operational steps discussed herein may also be performed simultaneously or near-simultaneously with one another.

The method 500 of FIG. 5 is described as being performed by the autonomy system of an automated vehicle (e.g., the system 150, the system 250, the analysis and control module 300, etc.). However, in some embodiments, one or more of the steps may be performed by different processor(s) or any other computing device. For instance, one or more of the steps may be performed via a cloud-based service or another processor in communication with the processor of the automated vehicle and/or autonomy system of the automated vehicle. Although the steps are shown in FIG. 5 as having a particular order, it is intended that the steps may be performed in any order. It is also intended that some of these operational steps, functions, and features mentioned in FIG. 5 may be optional.

In operation 501, an autonomy system obtains and gathers sensor data for an operating environment, including a roadway and one or more traffic vehicles. The autonomy system obtains sensor data from one or more perception sensors and operational components of the autonomy system (e.g., perception module 202, localization module 204, vehicle control module 206, processor 210 of autonomy system). The sensor and operational components of the autonomy system may include software components, hardware components, or combination software-hardware components, among others. The components of the automated vehicle may execute to generate information relating to autonomous or semi-autonomous operation of the automated vehicle using sensor data captured by sensors of the automated vehicle. The sensors may generate image data representing sensed map or sensed objects based upon various types of sensors. For instance, the sensors include cameras or LiDAR sensors, and the autonomy system generates the sensor or image data using the LiDAR data or camera data.

In operation 503, the autonomy system identifies one or more traffic vehicles in the roadway based on the sensor data and an object recognition engine. The components of the autonomy system applies an object recognition engine on the various types of perception sensor data (e.g., image data, radar data, LiDAR data) from the perception sensors (e.g., camera, radar, LiDAR). The recognition engine of the autonomy system comprises software trained or configured for recognizing various types of objects based on the perception data. Additionally or alternatively, the components of the autonomy system can receive the perception data from the perception sensors to generate a sensed map of a roadway or other operating environment of the automated vehicle.

In operation 505, the autonomy system applies a bounding box around each traffic vehicle. After the object recognition engine detects the presence of one or more traffic vehicles in the image data (generated from the camera and/or LiDAR data), the autonomy system then applies corresponding bounding boxes associated with the traffic vehicle in the image data, allowing components of the autonomy system to track and update the related information about the traffic vehicles and operating environment.

In some cases, the autonomy system updates log entries or metadata associated with the traffic vehicles stored in a database hosted on a non-transitory machine-readable storage accessible to the processor executing the autonomy system. The data storage hosting the database may be situated on board the automated vehicle or at a remote computing device (e.g., remote server 107). The autonomy system updates the database to include information about the traffic vehicles, objects, or other aspects of the sensed environment. The traffic information may include, for example, dimensions, distances, velocities, bounding boxes, behavior information, and the like.

As an example, the autonomy system may update the image data or database with traffic vehicle about a particular traffic vehicle to indicate the bounding box or expanded box pixels (e.g., location, size), the estimated velocity or relative velocity of the traffic vehicle, and historic positions of the traffic vehicle in the image data or map data, among other types of information.

As another example, the autonomy system may update the image data or database with traffic information about a particular traffic vehicle to include a metadata tag, indicating that the particular vehicle is a close vehicle or an encroaching vehicle within one or more threshold distances from the automated vehicle.

As another example, the autonomy system derives and updates an estimated velocity of the close vehicle based upon the position history of the close vehicle stored in the database. The autonomy system may compute or model an estimated historic trajectory track of the close vehicle and/or a predicted trajectory track for the close vehicle up to a future time (e.g., 2 seconds into the future) based upon the position history of the close vehicle stored in the database.

The autonomy system may continually update the traffic vehicle information in the database. In some configurations, the autonomy system only updates the traffic vehicle information for close vehicles or encroaching vehicles. For instance, the autonomy system continually updates the position history, estimate velocity, and historic trajectory tracks. In some cases, the autonomy system continually updates the predicted trajectory tracks for the close vehicles or encroaching vehicles.

In operation 507, the autonomy system identifies a close vehicle of the one or more recognized and identifier traffic vehicles is within a threshold distance from the automated vehicle. The first threshold distance includes, for example, a threshold range-distance, where a range-distance is the amount of distance ahead of or behind the automated vehicle; or a threshold horizontal-distance, where a horizontal-distance is the amount of distance alongside or longitudinal to the automated vehicle. In some implementations, the autonomy system generates and applies a tag (or other types of metadata) to the image data or database for each close traffic vehicle detected by the autonomy system, in response to determining that a traffic vehicle is a close vehicle.

In operation 509, the autonomy system generates an expanded bounding box associated with the close vehicle in the image data and/or map data. The expanded bounding box has a comparatively larger size than the initial bounding box, thereby representing an additional safety buffer for traffic vehicles nearer the automated vehicle. The size of the expanded bounding box is based upon an artificial expansion configuration, indicating the safety buffer size for generating the expanded bounding box.

In some implementations, the autonomy system generates the expanded bounding box having a safety buffer size and overall size relative to a velocity of the automated vehicle or the close vehicle. For example, the size of the expanded bounding box is larger at slower speeds and smaller at higher speeds. The autonomy system continually updates the size of the expanded bounding box using the continually updated vehicle information for the close vehicle or using the inertial measurements (e.g., velocity) of the automated vehicle.

In operation 511, the autonomy system detects an encroaching vehicle as the close vehicle using the expanded bounding box of the close vehicle. For instance, the autonomy system determines that the expanded bounding box of the close vehicle is within another (second) threshold distance from the automated vehicle, thereby detecting the encroaching vehicle as the close vehicle. The second threshold distance may be a threshold horizontal-distance or threshold range-distance. Additionally or alternatively, the second threshold distance may be based upon the autonomy system detecting an overlap or contact between the expanded bounding box of the close vehicle and a middle-lane line that separates the automated vehicle and the close vehicle, or by detecting that the expanded bounding box of the close vehicle enters into the current lane automated vehicle's current lane of travel.

In some embodiments, the autonomy system detects the encroaching vehicle as the close vehicle, using the expanded bounded box of the close vehicle and based upon the predicted trajectory track of the close vehicle. The autonomy system generates the predicted trajectory track of the close vehicle up to the future time by modeling or otherwise determining a progression of projected or estimated vehicle positions of the close vehicle over time, from a current or initial time to the future time. The autonomy system may generate the predicted trajectory track for the close vehicle by referencing the historic trajectory track and the velocity of the close vehicle stored in the local or remote database. The autonomy system detects the encroaching vehicle as the close vehicle in response to determining that the expanded bounding box of the close vehicle is within the second threshold distance (e.g., contact or overlap with the middle-lane line; entry into the middle lane) at a point or estimated position of the close vehicle along the predicted trajectory track of the close vehicle.

For instance, the autonomy system generates the predicted trajectory track having any number of predicted positions of the close vehicle up to some future point in time.

The future point in time may be a preconfigured time interval defined by an amount of time indicated by the programming instructions of the autonomy system's software components. The autonomy system simulates or models the behavior of the adjacent vehicle over the time interval, from the initial time to the future time. The autonomy system generates the predicted positions and predicted trajectory track for the close vehicle based upon the velocity of the close vehicle (e.g., absolute velocity; relative velocity relative to the automated vehicle) and the historical positions of the close vehicle. In some cases, the autonomy system generates the predicted velocity of the close vehicle at one or more predicted positions in the future. For example, using predicted trajectory track of the close vehicle, the autonomy system generates the predicted position and the predicted velocity of the close vehicle at two seconds into the future. Using the predicted position, the autonomy system may identify a predicted encroachment event, in which the expanded bounding box of the close vehicle encroaches (e.g., contacts, enters) upon the automated vehicle's current lane of travel.

In operation 513, the autonomy system generates an avoidance instruction for operating the automated vehicle, in response to detecting the encroaching vehicle. Non-limiting examples of the avoidance action include slowing down, biasing away from the encroaching vehicle, or sounding a horn, among others. The autonomy system may instruct the automated vehicle to bias away from the encroaching vehicle at a preconfigured amount or based on an amount that the mirrors an amount that the encroaching vehicle entered the automated vehicle's current lane of travel.

The autonomy system generates and transmits the avoidance instruction as a control command that causes the automated vehicle to perform the avoidance action. The autonomy system provides the command a downstream component (e.g., vehicle control module 206) of the autonomy system responsible for operating the physical components of the automated vehicle, such as steering or braking. For example, the control component can generate and/or execution operational instructions that control how the automated vehicle navigates the roadway, which may include controlling the automated vehicle to bias away, slow down, or sound the horn, in response to detecting the encroaching vehicle.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for navigation planning for an automated vehicle, the method comprising:

identifying, by an object tracking and classification module executed by one or more processors of an automated vehicle, via an artificial intelligence model, one or more traffic vehicles in image data obtained from one or more sensors of the automated vehicle;

for each traffic vehicle of the one or more traffic vehicles, generating, by the object tracking and classification module, a bounding box associated with the traffic vehicle in the image data;

tracking, by the object tracking and classification module, the one or more traffic vehicles with bounding boxes by:

matching bounding boxes of the one or more traffic vehicles predicted by the artificial intelligence model with one or more tracking identifiers of the one or more traffic vehicles;

identifying, by the one or more processors, a close vehicle of the one or more traffic vehicles, the close vehicle identified within a first threshold distance from the automated vehicle;

generating, by the one or more processors, an expanded bounding box associated with the close vehicle in the image data, the expanded bounding box having a comparatively larger size than the bounding box;

determining, by the one or more processors, that the expanded bounding box of the close vehicle is within a second threshold distance shorter than the first threshold distance, from the automated vehicle, thereby detecting an encroaching vehicle as the close vehicle;

generating, by the one or more processors, an avoidance instruction for operating the automated vehicle, in response to detecting the encroaching vehicle; and controlling, by a control module executed by the one or more processors, operation of the automated vehicle according to the avoidance instruction.

2. The method according to claim 1, wherein the first threshold distance includes at least one of: a threshold range-distance ahead of or behind the automated vehicle, or a threshold horizontal-distance alongside the automated vehicle.

3. The method according to claim 1, wherein the second threshold distance relative to the expanded bounding box includes at least one of: a threshold horizontal-distance alongside the automated vehicle, or a contact between the expanded bounding box and a middle-lane line.

4. The method according to claim 1, further comprising:

updating, by the one or more processors, a position history of the close vehicle using a plurality of historic positions of the close vehicle; and updating, by the one or more processors, a trajectory track of the close vehicle based upon the position history of the close vehicle.

5. The method according to claim 4, wherein the one or more processors continually updates the position history and the trajectory track for the close vehicle.

6. The method according to claim 1, further comprising deriving, by the one or more processors, a velocity of the close vehicle based upon a position history of the close vehicle stored in a non-transitory storage accessible to the one or more processors.

7. The method according to claim 1, wherein detecting the encroaching vehicle as the close vehicle includes:

generating, by the one or more processors, a predicted trajectory track of the close vehicle to a future time by modeling the close vehicle to the future time using a trajectory track and a velocity of the close vehicle, wherein the one or more processors detects the encroaching vehicle as the close vehicle in response to determining that the expanded bounding box of the close vehicle is within the second threshold distance at a point along the predicted trajectory track of the close vehicle.

8. The method according to claim 1, wherein the one or more processors generates the expanded bounding box for the close vehicle having a size relative to a velocity of at least one of: the automated vehicle or the close vehicle.

9. The method according to claim 1, wherein the avoidance instruction includes at least one of: slowing down, biasing away from the encroaching vehicle, or sounding a horn.

10. The method according to claim 1, wherein the one or more processors generates the expanded bounding box having the comparatively larger size in accordance with a preconfigured safety buffer size.

11. A system for navigation planning for an automated vehicle, the system comprising:

a non-transitory computer-readable memory on board an automated vehicle configured to store image data for a roadway associated with one or more traffic vehicles obtained from one or more sensors of the automated vehicle; and one or more processors of the automated vehicle configured to:

identify, by an object tracking and classification module executed by one or more processors, via an artificial intelligence model, the one or more traffic vehicles in the image data obtained from the one or more sensors of the automated vehicle;

for each traffic vehicle of the one or more traffic vehicles, generate, by the object tracking and classification module, a bounding box associated with the traffic vehicle in the image data;

tracking, by the object tracking and classification module, the one or more traffic vehicles with bounding boxes by:

matching bounding boxes of the one or more traffic vehicles predicted by the artificial intelligence model with one or more tracking identifiers of the one or more traffic vehicles;

identify a close vehicle of the one or more traffic vehicles, the close vehicle identified within a first threshold distance from the automated vehicle;

generate an expanded bounding box associated with the close vehicle in the image data, the expanded bounding box having a comparatively larger size than the bounding box;

determine that the expanded bounding box of the close vehicle is within a second threshold distance shorter than the first threshold distance, from the automated vehicle, thereby detecting an encroaching vehicle as the close vehicle;

generate an avoidance instruction for operating the automated vehicle, in response to detecting the encroaching vehicle; and controlling, by a control module executed by the one or more processors, operation of the automated vehicle according to the avoidance instruction.

12. The system according to claim 11, wherein the first threshold distance includes at least one of: a threshold range-distance ahead of or behind the automated vehicle, or a threshold horizontal-distance alongside the automated vehicle.

13. The system according to claim 11, wherein the second threshold distance relative to the expanded bounding box includes at least one of: a threshold horizontal-distance alongside the automated vehicle, or a contact between the expanded bounding box and a middle-lane line.

14. The system according to claim 11, wherein the one or more processors is further configured to:

update a position history of the close vehicle using a plurality of historic positions of the close vehicle; and update a trajectory track of the close vehicle based upon the position history of the close vehicle.

15. The system according to claim 14, wherein the one or more processors continually updates the position history and the trajectory track for the close vehicle.

16. The system according to claim 11, wherein the one or more processors is further configured to derive a velocity of the close vehicle based upon a position history of the close vehicle stored in a non-transitory storage accessible to the one more processors.

17. The system according to claim 11, wherein when detecting the encroaching vehicle as the close vehicle, the one or more processors is further configured to generate a predicted trajectory track of the close vehicle to a future time by modeling the close vehicle to the future time using a trajectory track and a velocity of the close vehicle; and wherein the one or more processors detects the encroaching vehicle as the close vehicle in response to determining that the expanded bounding box of the close vehicle is within the second threshold distance at a point along the predicted trajectory track of the close vehicle.

18. The system according to claim 11, wherein the one or more processors generates the expanded bounding box for the close vehicle having a size relative to a velocity of at least one of: the automated vehicle or the close vehicle.

19. The system according to claim 11, wherein the avoidance instruction includes at least one of: slowing down, biasing away from the encroaching vehicle, or sounding a horn.

20. The system according to claim 11, wherein the one or more processors generates the expanded bounding box having the comparatively larger size in accordance with a preconfigured safety buffer size.

* * * * *